United States Patent
Whitney et al.

[11] Patent Number: 5,125,199
[45] Date of Patent: Jun. 30, 1992

[54] FLOOR DUCT WITH INTEGRAL INTERLOCK

[75] Inventors: Robert I. Whitney, Brookville; Donald L. Chapman, Liberty, both of Ind.

[73] Assignee: Square D Company, Palatine, Ill.

[21] Appl. No.: 435,635

[22] Filed: Nov. 13, 1989

[51] Int. Cl.⁵ .............................................. E04B 5/48
[52] U.S. Cl. ..................................... 52/221; 52/508; 174/48; 174/683; 138/157; 138/162
[58] Field of Search .................. 138/157, 162–163; 174/48–49, 68.3, 95; 220/3.2, 4 B, 4 E, 75–76, 80; 52/220, 221, 508, 574; 29/897.3

[56] References Cited

U.S. PATENT DOCUMENTS

| | | | |
|---|---|---|---|
| 1,681,593 | 8/1928 | Pahl | 29/897.3 |
| 1,797,706 | 3/1931 | Winslow | 52/574 |
| 1,951,470 | 3/1934 | Cole | 220/75 |
| 2,049,184 | 7/1936 | Walsleben | 138/157 X |
| 2,081,197 | 5/1937 | Goeller | 52/221 |
| 2,445,197 | 7/1948 | Wisemann | 52/221 |
| 2,721,983 | 10/1955 | Blinn | 174/48 X |
| 2,729,429 | 1/1956 | Goemann | |
| 2,812,654 | 11/1957 | Hoseason | 138/157 X |
| 2,931,533 | 4/1960 | Wiesmann | 220/3.4 |
| 3,264,792 | 8/1966 | Drazdik et al. | 52/508 |
| 3,303,264 | 2/1967 | Saul et al. | 174/48 |
| 3,334,457 | 8/1967 | Hudson et al. | 52/221 |
| 3,338,450 | 8/1967 | Rose | 220/3.94 |
| 3,405,488 | 10/1968 | Nelson | 174/68.3 |
| 3,405,834 | 10/1968 | Butler et al. | 220/3.4 |
| 3,426,492 | 2/1969 | Fork | 52/221 |
| 3,530,627 | 9/1970 | Carter et al. | 52/221 |
| 3,593,468 | 7/1971 | Bustin | 52/221 X |
| 3,609,210 | 9/1971 | Guritz | 174/49 |
| 3,721,051 | 3/1973 | Fork | 52/173 |
| 3,745,229 | 7/1973 | de Vos | 174/101 |
| 3,751,576 | 8/1973 | Klinkman et al. | 174/48 |
| 3,793,793 | 2/1974 | Dobbins | 52/221 |
| 3,812,636 | 5/1974 | Albrecht et al. | 52/334 |
| 3,972,579 | 8/1976 | Kohaut | 339/34 |
| 4,017,137 | 4/1977 | Parks | 339/21 R |
| 4,178,469 | 12/1979 | Fork | 174/48 |
| 4,237,666 | 12/1980 | Kohaut | 52/221 |
| 4,338,484 | 7/1982 | Littrell | 174/48 |
| 4,454,692 | 6/1984 | Ault | 52/221 |
| 4,682,456 | 7/1987 | Hartman et al. | 52/221 |
| 4,723,349 | 2/1988 | Grimes | 138/162 X |
| 4,760,675 | 8/1988 | Bowman et al. | 52/221 |
| 4,899,506 | 2/1990 | Chapman et al. | 52/221 |

FOREIGN PATENT DOCUMENTS

| | | |
|---|---|---|
| 489465 | 1/1953 | Canada . |
| 493561 | 6/1953 | Canada . |
| 2348028 | 4/1975 | Fed. Rep. of Germany ...... 138/163 |

Primary Examiner—David A. Scherbel
Assistant Examiner—Kien Nguyen
Attorney, Agent, or Firm—D. Russell Stacey

[57] ABSTRACT

An underfloor duct designed to be imbedded in a concrete floor is constructed from first and second duct partial sections which are held together by an interlocking structure integrally formed from the sheet metal of the duct partial sections. In a preferred form the duct partial sections are duct half sections substantially identically formed from sheet metal. In another preferred form, the duct partial sections define flanges extending outwardly at an intermediate level along the sides of a rectangular cross section duct, whereby the duct may be supported from the flanges. Also, multiple cell duct configurations are disclosed.

10 Claims, 4 Drawing Sheets

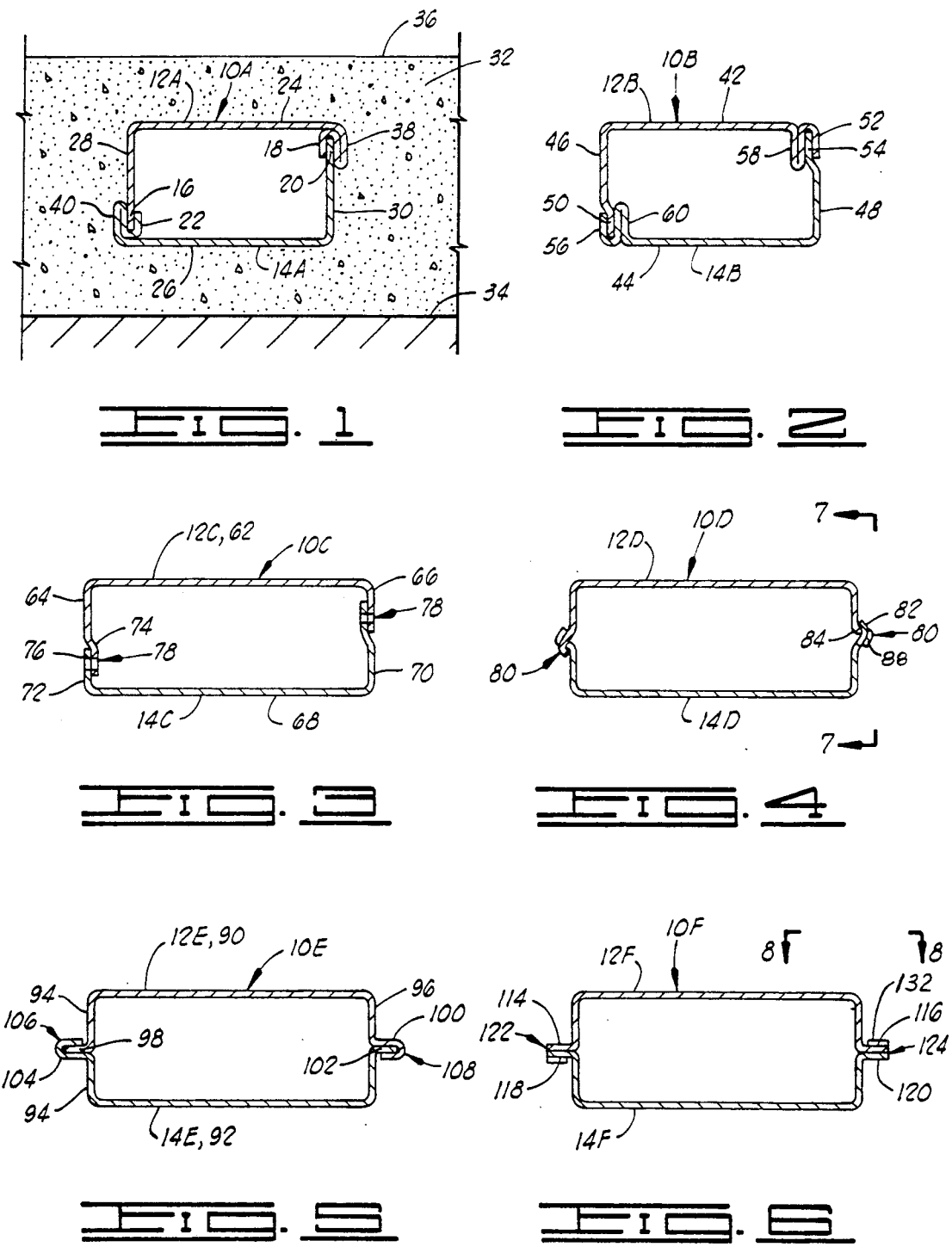

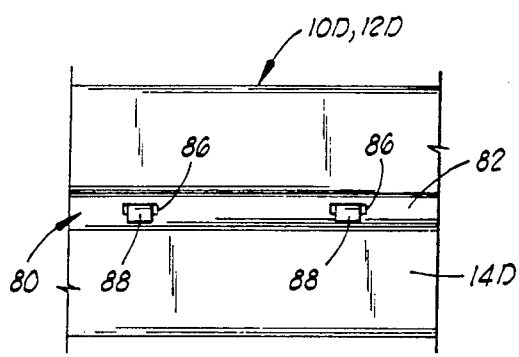
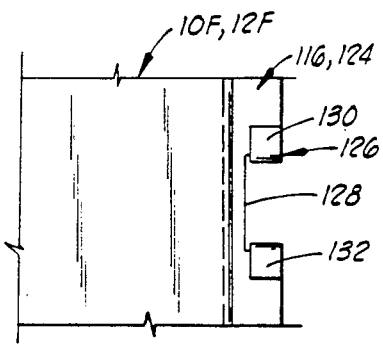
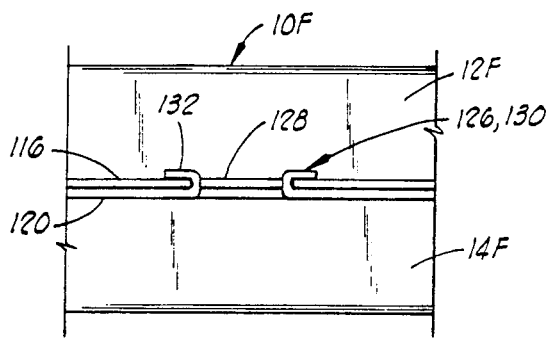
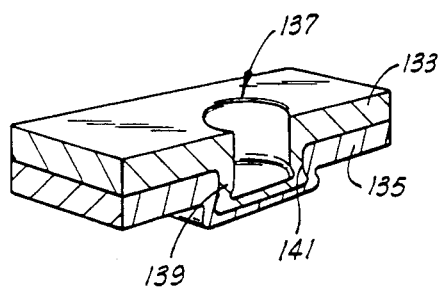
"PRIOR ART"
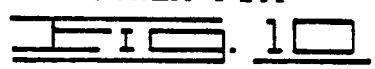
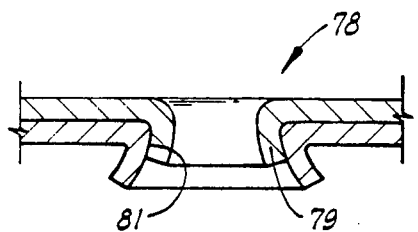
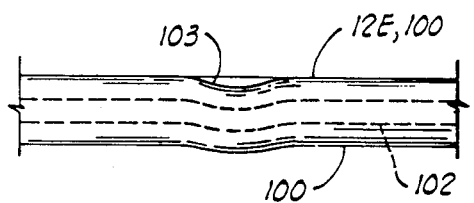
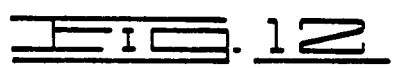

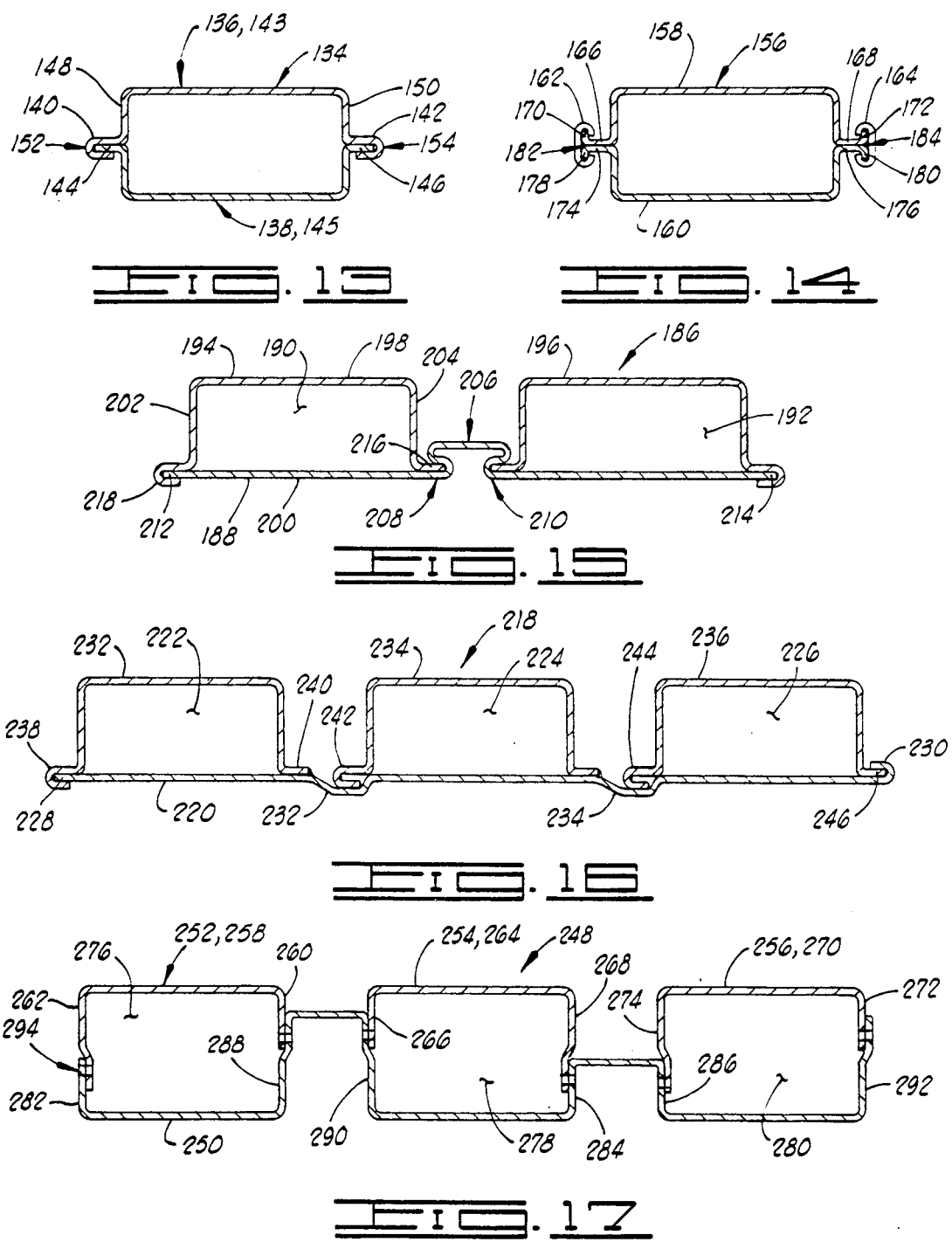

FLOOR DUCT WITH INTEGRAL INTERLOCK

This invention relates generally to underfloor ducts designed to be imbedded in a concrete floor.

BACKGROUND OF THE INVENTION

Underfloor duct is an electrical raceway system designed to be imbedded in the concrete floor of offices, classrooms, laboratories, manufacturing areas, supermarkets, etc., for the purpose of providing an enclosed raceway for wires and cables from their originating panel to their point of use.

Such an underfloor raceway system includes two types of ducts, namely feeder ducts and distribution ducts. Complementing those two types of ducts are junction boxes, support couplers and supports, horizontal and vertical elbows, power and telephone outlets and numerous cast and sheet metal fittings such as conduit adapters, change of direction duct runs, "Y" take-offs, etc.

Typical examples of such underfloor duct systems are seen in U.S. Pat. No. 3,405,834 to Butler et al. and U.S. Pat. No. 3,338,450 to Rose, both assigned to the assignee of the present invention. The ducts used with systems like those shown in the Butler et al. and Rose patents typically are rectangular cross section, seamless ducts which are formed by rolling a metal sheet into the rectangular cross-sectional shape and forming a seamless weld where the edges of the sheet meet.

The prior art has also included a number of electrical raceway systems wherein the raceway is constructed from two or more components which are joined together.

U.S. Pat. No. 4,338,484 to Littrell discloses a floor duct having a generally flat bottom section, and an inverted channel-shaped top section, with flanges extending horizontally from the lower end of the legs of the upper channel section. These flanges are superimposed upon and attached to the lower section of the duct.

U.S. Pat. No. 2,931,533 to Wiesmann discloses a two-piece duct utilized with cellular metal flooring wherein the two-piece duct is formed from a flat lower piece and an inverted channel-shaped upper piece having horizontal flanges at its lower edges which are received in grooves defined in the lower piece. The sections are then welded together to form an integral unit.

Also, many cellular metal flooring systems utilize separate components to define the raceways or conduits located within the cellular metal flooring. For example, U.S. Pat. No. 3,812,636 to Albrecht et al. illustrates at FIG. 37 thereof a cellular metal flooring system having individual bottom panels for defining wiring enclosures in the raised portions of the cellular metal flooring.

SUMMARY OF THE INVENTION

The present invention provides a number of alternative designs for underfloor ducts, particularly those designed to be completely imbedded in a concrete floor.

In one embodiment of the invention a floor construction includes a generally horizontally extending duct having first and second duct half sections substantially identically formed from sheet metal and having lengthwise edge portions held together by an interlocking structure integrally formed from the sheet metal of the duct half sections to define a generally rectangular cross-sectional shape. A concrete floor is poured in place about the duct so that the duct is substantially completely surrounded by concrete on all four sides of its rectangular cross-sectional shape.

In another embodiment, a floor duct is provided having first and second duct partial sections formed from sheet metal and having lengthwise edge portions connected together, the duct partial sections defining a top, a bottom, and first and second sides to form a generally rectangular cross-sectional shape. The edge portions form first and second flanges extending outward from the first and second sides, respectively, with the flanges being located intermediately between the top and bottom and running lengthwise along the sides. Such ducts are preferably utilized in combination with a support means for supporting the duct, which support means engages at least one of the flanges.

A further embodiment of the invention provides a floor duct having first and second duct partial sections formed from sheet metal and having lengthwise edge portions held together by a tongue and groove interlocking structure integrally formed from the sheet metal of the duct partial sections. The tongue and groove interlocking structure includes a first tongue defined along one lengthwise edge portion of one of the first and second duct partial sections, and a first groove defined along another lengthwise edge portion of the other of the first and second duct partial sections. The groove is formed by an S-shaped double fold of the sheet metal, with the tongue being held in place in the groove primarily by frictional engagement therebetween.

Another embodiment of the invention provides a floor duct having first and second duct partial sections formed from sheet metal. Each of the duct partial sections is generally channel shaped in cross section, with the duct partial sections being arranged channel opening toward channel opening to define a generally rectangular-shaped cross section of the duct. The first and second duct partial sections include first and second superimposed outwardly extending flanges, respectively, which flanges include lips turned in opposite directions so that the flanges and lips form a split T-shaped rib extending lengthwise from the duct. A plurality of clips span the lips for holding the split T-shaped rib together thus holding the duct sections together.

Several multi-cell embodiments of the invention are provided. Each of these provide a generally horizontally extending multi-cell floor duct including a common duct partial section formed from sheet metal and defining at least one side of each of a plurality of parallel cells. A plurality of individual duct partial sections substantially identically formed from sheet metal are provided. Each of the individual duct partial sections, in combination with an associated portion of the common duct partial section, defines a respective cell of the plurality of parallel cells. A concrete floor is poured in place about the duct so that the duct is substantially completely surrounded by concrete on all sides of a cross section thereof.

Numerous objects, features and advantages of the present invention will be readily apparent to those skilled in the art upon a reading of the following disclosure when taken in conjunction with the accompanying drawings.

BRIEF DESCRIPTION OF THE DRAWINGS

FIG. 1 is an end elevation view of a single-cell duct constructed in accordance with a first embodiment of the invention. The duct of FIG. 1 is shown imbedded in concrete.

FIG. 2 is an end elevation view of a single-cell duct constructed in accordance with a second embodiment of the invention.

FIG. 3 is an end elevation view of a single-cell duct constructed in accordance with a third embodiment of the invention.

FIG. 4 is an end elevation view of a single-cell duct constructed in accordance with a fourth embodiment of the invention.

FIG. 5 is an end elevation view of a single-cell duct constructed in accordance with a fifth embodiment of the invention.

FIG. 6 is an end elevation of a single-cell duct constructed in accordance with a sixth embodiment of the invention.

FIG. 7 is a right side elevation view illustrating the construction of the interlocking structure of FIG. 4.

FIG. 8 is a partial plan view taken along line 8—8 of FIG. 6 showing a tab and notch-type connection means.

FIG. 9 is a right side elevation view of the tab and notch connection of FIG. 8.

FIG. 10 is an elevation sectioned view of one particular form of stitched interlocking structure.

FIG. 11 is a cross-section view of another form of stitched interlocking structure.

FIG. 12 is an enlarged view of a crimping interlock.

FIG. 13 is an end elevation view of a single-cell duct constructed in accordance with a seventh embodiment of the invention.

FIG. 14 is an end elevation view of a single-cell duct constructed in accordance with an eighth embodiment of the invention.

FIG. 15 is an end elevation view of a ninth embodiment of the invention providing a two-cell duct.

FIG. 16 is an end elevation view of a tenth embodiment of the invention providing a three-cell duct.

FIG. 17 is an end elevation view of an eleventh embodiment of the invention providing another three-cell duct.

DETAILED DESCRIPTION OF THE PREFERRED EMBODIMENTS

Figure 18:
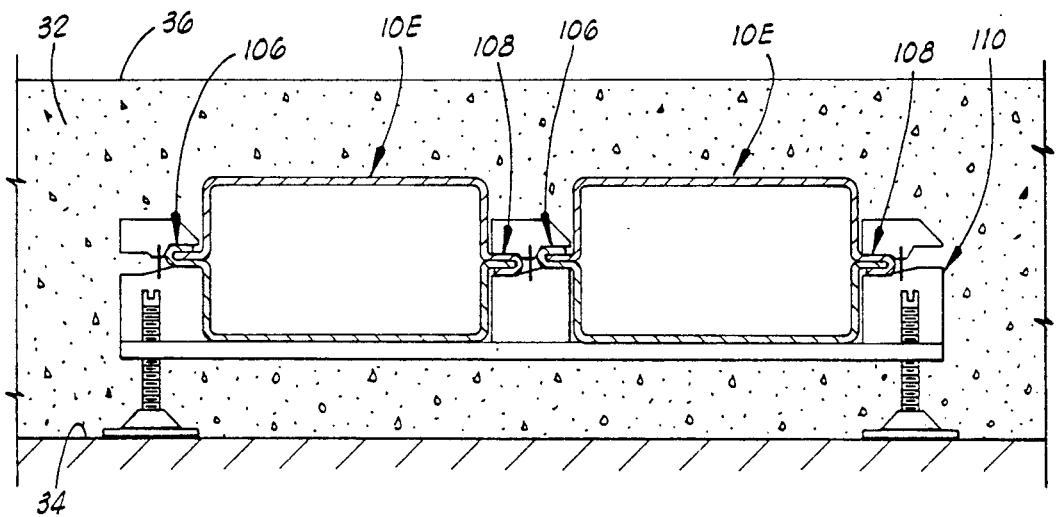
FIG. 18 is an end elevation view showing two single-cell ducts like those of FIG. 5 supported from a base floor by a support apparatus and imbedded in concrete.

In FIGS. 1-6, six different embodiments are illustrated of ducts formed from two substantially identical half sections. Such a construction is preferred in that only a single shape needs to be formed and then two lengths of that shape can be combined together to form the rectangular cross-sectional duct. This minimizes tooling costs and inventory costs.

In FIG. 1, duct 10A is shown in end elevation view. The length of the duct extends normal to the plane of FIG. 1. The duct 10A is typically installed as a generally horizontally extending duct, and it has first and second duct half sections 12A and 14A which are substantially identically formed from sheet metal. The duct half sections 12A and 14A can be more generally referred to as first and second duct partial sections 12A and 14A.

The first duct half section 12A has a tongue 16 defined along one lengthwise edge portion thereof and a groove 18 defined along the other lengthwise edge portion thereof. The groove 18 is formed by folding over the sheet metal along said other lengthwise edge portion in an S-shaped double fold.

The second duct half section 14A is identically constructed and has a tongue 20 and a groove 22.

The tongue 16 of first duct half section 12A is received in the groove 22 of second duct half section 14A and is held in place therein primarily by frictional engagement therebetween. Similarly the tongue 20 of second duct half section 14A is frictionally held in place within the groove 18 of first duct half section 12A. Each of the combined tongues and grooves 16,22 and 18,20 can generally be referred to as an interlocking tongue and groove structure.

As seen in FIG. 1, when the duct half sections 12A and 14A are assembled together by the tongue and groove interlocking structures 16,22 and 18,20 they define a generally rectangular cross-sectional shape having a top 24, bottom 26, and first and second sides 28 and 30.

A concrete floor 32 is poured in place about the duct 10A so that the duct is substantially completely surrounded by concrete on all four sides of its generally rectangular cross-sectional shape. The concrete floor 32 is poured upon a floor base 34 and has a top surface 36.

The tongue and groove structure 16,22 can generally be described as defining a portion of the side 28 of the rectangular cross-sectional shape, and the tongue 16 and groove 22 are each generally parallel to the side 28. Similarly, the tongue 20 and groove 18 form part of and are generally parallel to the side 30.

The tongue and groove structures 16,22 and 18,20 are located adjacent diagonally opposite corners of the generally rectangular cross section of duct 10A.

The S-shaped double fold which forms the groove 18 forms a rolled hem 38 lying outside the tongue 20. Similarly, the double S-shaped fold which forms the groove 22 also defines a rolled hem 40 lying outside of the tongue 16.

FIG. 2 illustrates a second embodiment of the invention showing a duct 10B having first and second substantially identical duct half sections 12B and 14B. The duct 10B has a top 42, bottom 44, and first and second sides 46 and 48.

The first duct half section 12B includes a tongue 50 slightly offset from but still parallel to the plane of first side 46. Duct half section 12B also includes a groove 52 formed by an S-shaped fold of the sheet metal of duct half section 12B. Similarly, second duct half section 14B includes a tongue 54 and a groove 56.

The tongue and groove structures 50,56 and 54,52 are located adjacent diagonally opposite corners of the generally rectangular cross section of the duct 10B.

The S-shaped double folds defining the grooves 52 and 56 of the duct 10B of FIG. 2 are constructed differently from the S-shaped double folds of the duct 10A of FIG. 1. In the embodiment of FIG. 2, the S-shaped double fold forming the groove 52 defines a hem 58 lying inside the tongue 54. Similarly the S-shaped double fold defining groove 56 of second duct half section 14B defines a hem 60 lying inside the tongue 50.

Although not shown in FIG. 2, and in many of the other figures, each of the ducts disclosed herein is intended to be imbedded in a concrete floor like floor 32 of FIG. 1.

FIG. 3 illustrates a third embodiment of the present invention which is generally designated by the numeral 10C. The duct 10C includes two substantially identical duct half sections 12C and 14C.

The duct half section 12C is substantially channel shaped having a middle web 62 and having a longer leg 64 and a shorter leg 66. Similarly, the second duct half section 14C includes a web 68, longer leg 70 and shorter leg 72.

The longer leg 64 has a slightly offset lengthwise edge portion 74 which overlaps with a lengthwise edge portion 76 of shorter leg 72. A similar overlap is provided in legs 66 and 70.

A stitched interlocking structure 78, the details of which are shown in FIG. 11, is integrally formed from the sheet metal of the duct half sections 12C and 14C to hold them together and thus define the generally rectangular cross-sectional shape seen in FIG. 3. The metal stitches 78 are formed by extruding sheet metal 79 from one of the duct half section 12C into recesses 81 formed in the other duct half section 14C, as schematically illustrated in FIG. 11.

FIG. 4 is an end elevation view of a fourth embodiment of the present invention which is generally designated by the numeral 10D. The duct 10D is made up of substantially identical duct half sections 12D and 14D.

An interlocking structure 80 holds the two duct half sections 12D and 14D together. Interlocking structure 80 is a tab and notch type structure, the details of which are best seen in the right side elevation view of FIG. 7.

The interlocking structure 80 is similarly formed on each side of the rectangular cross section. The lower duct half section 14D includes a semi-cylindrical lengthwise edge portion 82 having a plurality of slots or notches 86 formed therein. A complementary lengthwise edge portion 84 of first duct half section 12D includes a plurality of tabs 88 integrally formed therewith which are received through the notches 86 and bent over to somewhat conform to the outer surface of the rolled semi-cylindrical edge portion 82 to lock the two duct half sections 12D and 14D together.

Referring now to FIG. 5, a fifth embodiment of the invention is designated as 10E. The duct 10E includes first and second substantially identical duct half sections 12E and 14E.

The duct 10E has a top 90, bottom 92, and first and second sides 94 and 96.

The first duct half section 12E has a tongue 98 defined along one lengthwise edge portion thereof, and a groove 100 defined along the other lengthwise edge portion thereof by folding over the sheet metal. Similarly, the second duct half section 14E includes a tongue 102 and a groove 104. The tongue 98 of first duct half section 12E is received in groove 104 second duct half section 14E. Similarly the tongue 102 of second duct half section 14E is received in the groove 100 of first duct half section 12E. Each of the tongue and groove structures such as 98,104 is held in place primarily by crimping of the tongue and groove together. This crimping can be performed in many different manners, one example of which is illustrated in FIG. 12.

The tongue 98 and grooved edge portion 104 form a first flange 106 extending generally horizontally outward from first side 94. The tongue 102 and grooved edge portion 100 similarly form a second flange 108 extending generally horizontally outward from second side 96. The first and second flanges 106 and 108 are located at a vertically intermediate elevation along the sides 94 and 96 below the top 90 and above the bottom 92 of duct 10E. Preferably the flanges 106 and 108 are located at approximately a mid-elevation between top 90 and bottom 92.

FIG. 12 rather schematically illustrates the manner in which the tongue 102 and groove 100 can be crimped together. FIG. 12 is a right-side elevation view of the flange 108 of FIG. 5. A crimp 103 has been formed in U-shaped groove portion 100 and tongue portion 102.

FIG. 18 shows two of the ducts 10E supported from floor base 34 by a support means generally designated as 110 for supporting the ducts 10E from base 34 on which the concrete floor 32 is poured. The support means 110 engages the flanges 106 and 108 to hold the ducts 10E in place relative to the base 34 prior to hardening of the concrete floor 32.

Figure 19:
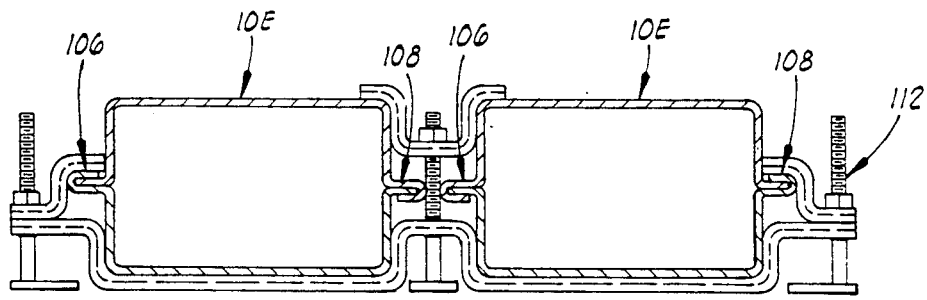
FIG. 19 is an end elevation view again showing two single-cell ducts like those of FIG. 5 supported by another type of support apparatus.

FIG. 19 illustrates another support means 112 designed for usage with the ducts 10E or with other ducts as will be described below which have flanges analogous to the flanges 106 and 108.

FIG. 6 illustrates a sixth embodiment of the present invention generally designated by the numeral 10F. The duct 10F includes two substantially identically formed sheet metal duct half sections 12F and 14F. Each of the duct half sections is channel shaped. Duct half section 12F has horizontally outwardly extending flanged edge portions 114 and 116, and duct section 14F includes horizontally outwardly extending flanged edge portions 118 and 120.

The flanged edge portions 114 and 118 engage each other and are held together to define a first flange 122. The flanged edge portions 116 and 120 are held together to define a second flange 124.

The duct 10F with flanges 122 and 124 can be supported by support structures such as 110 and 112 of FIGS. 18 and 19 as previously described.

The flanged edge portions 114 and 118 can be held together by any number of interlocking structures integrally formed from the sheet metal of the duct half sections 12F and 14F, in order to form the flange 122. One preferred form of connection is shown in FIGS. 8 and 9. In FIGS. 8 and 9 an interlocking structure is generally designated by the numeral 126. The interlocking structure 126 includes a series of alternating tabs and notches integrally formed in each of the flanged edge portions 116 and 120. For example, the flanged edge portion 116 includes a generally rectangular-shaped notch 128 therein, which is superimposed over a pair of tabs 130 and 132 which are integrally formed in the flanged edge portion 120. The two tabs 130 and 132 extend through the notch 128 and are bent over the edge thereof.

At the next location (not shown) lengthwise down the flange 124 the notch and tab will be reversed with the notch being placed in the lower flanged edge portion 120 with two tabs being formed in the upper flanged edge portion 116.

Thus, each of the duct half sections 12F and 14F will be identically formed having alternating notches and tabs formed along each of its flanged edge portions.

The flanged edge portions 116 and 120 of flange 124 could also be held together by other interlocking structures such as the two forms of metal stitching illustrated in FIGS. 10 and 11.

The form of metal stitching shown in FIG. 11 has been generally described above. Another form of metal stitching is shown in FIG. 10. FIG. 10 shows two metal sheets 133 and 135 joined by a stitch 137 formed by a commercially available process known as TOG-L-LOC ® available from BTM Company. The stitch 137 has material 139 from sheet 133 extruded into a recess 141 in sheet 135 forming a button-shaped protrusion on sheet 135. In contrast to the type of stitch 78 shown in FIG. 11, the stitch 137 of FIG. 10 does not pierce the metal sheets.

Turning now to FIGS. 13–17, several additional embodiments of the invention are shown which do not use identical duct half sections, but instead use a plurality of duct partial sections which are not identical.

FIG. 13 discloses a duct 134 having first and second duct partial sections 136 and 138 formed from sheet metal.

The first duct partial section 136 is substantially channel shaped, and at the lower end of each of its legs has grooves 140 and 142 defined by folded over portions of the sheet metal along its lengthwise edge portions, which may also be referred to as edge portions. The second duct partial section 138 is also channel shaped, and has tongues 144 and 146 defined along each of its lengthwise edge portions, which tongues 144 and 146 are received in the grooves 140 and 142, respectively. After the tongue and groove connections have been assembly as shown in FIG. 13, preferably the tongue and groove 144, 140 will be crimped together as will the tongue and groove 146, 142. This crimping can be accomplished as shown for example in FIG. 12.

The assembled duct 134 of FIG. 13 has a top 143, bottom 145, and first and second sides 148 and 150.

The tongue and groove 144, 140 define a first flange 152 extending outward from the first side 148 intermediately between the top 143 and bottom 145. Similarly, the second tongue and groove 146,142 defines a second flange 154 extending outwardly from second side 150. Ducts like duct 134 can be supported in supports such as 110 and 112 shown in FIGS. 18 and 19, respectively.

Turning now to FIG. 14, another embodiment of the invention is shown and generally designated by the numeral 156. The duct 156 includes first and second substantially identical duct partial sections 158 and 160. The duct partial sections 158 and 160, which may also be referred to as substantially identical duct half sections 158 and 160, are not, however, held together by an integrally formed interlocking structure. Instead, a plurality of separate clips such as 162 and 164 are used to hold the duct sections 158 and 160 together.

The first duct section 158 is formed from sheet metal and is generally channel shaped in cross section. It includes flanged edge portions 166 and 168 having upwardly turned lips 170 and 172, respectively.

The second duct section 160 is similarly constructed having flanged edge portions 174 and 176 with downwardly turned lips 178 and 180.

The duct partial sections 158 and 160 are arranged channel opening toward channel opening to define a generally rectangular cross-sectional shape. On the left side of duct 156, the flanged edge portions 166 and 174 are superimposed with their lips 170 and 178 turned in opposite directions so that the flanges 166 and 174 and lips 170 and 178 form a split T-shaped rib 182 extending lengthwise along the left side of the duct 156. The clip 162, and a plurality of similar clips arranged along the length of rib 182 span the lips 170 and 178 for holding the split T-shaped rib 182 together and thus holding the duct sections 158 and 160 together. The right-hand side of the duct 156 is similarly constructed and held together by clips 164.

The clips 162 and 164 are simple sheet metal bands which are bent around the split T-shaped ribs 182 and 184.

Ducts like duct 156 can be supported by a support apparatus like apparatus 112 of FIG. 19.

Turning now to FIGS. 15–17, several multi-cell embodiments of the present invention are illustrated.

One common feature of all three multi-cell embodiments is that they each use a single common duct partial section which defines at least one side of each of the cells. They also each use a plurality of individual duct partial sections which are substantially identically formed from sheet metal to define the remainder of each of the individual cells. Thus for each of the multi-cell embodiments, only two different sheet metal cross sections must be formed.

FIG. 15 illustrates a two-cell duct designated by the numeral 186. The duct 186 includes a common duct partial section 188 formed from sheet metal and defining a bottom of each of two cells 190 and 192.

There are two individual duct partial sections 194 and 196 substantially identically formed from sheet metal. The first duct partial section 194, in combination with the left portion of the common duct partial section 188 defines the first cell 190. The second individual duct partial section 196 in combination with the right-hand portion of the common duct partial section 188 defines the second cell 192.

The first cell 190 has a top 198, a bottom 200, and first and second sides 202 and 204. The individual duct partial section 194 defines the top 194 and the first and second sides 202 and 204. It can generally be described as defining at least a substantial part of at least three sides of the generally rectangular cross-sectional shape of the cell 190.

It is noted that each of the duct partial sections 194 and 196 is constructed substantially identical to the duct half sections 12E and 14E of FIG. 5. It will also be noted that the same individual duct partial sections are utilized in the triple cell embodiment of FIG. 16. Again, by choosing to manufacture a line of products having these common components, the tooling and manufacturing costs can be minimized.

The common duct partial section 188 of duct 186 of FIG. 15 is formed from sheet metal and is a generally planar sheet having a raised central rib 206 integrally formed by two S-shaped double folds generally indicated as 208 and 210, to define two oppositely facing rib grooves also referred to as 208 and 210. The common duct partial section 188 can also be described as having two straight edge portions 212 and 214 extending generally parallel to the rib 206.

The first individual duct partial section 194 includes a tongue 216 defined along one lengthwise edge portion thereof and received in the groove of S-shaped double fold 208. Duct partial section 194 also includes a groove 218 defined by a metal fold along its other lengthwise edge portion. The straight edge portion 212 of common duct partial section 188 is received in the grooved edge portion 218 of first individual duct partial section 194. The straight edge portion 212 and groove 218 preferably are further held together by crimping which may be done as shown for example in FIG. 12.

The second individual duct partial section 196 is similarly constructed as is apparent in FIG. 15.

FIG. 16 illustrates a triple cell duct 218. The duct 218 includes a common duct partial section 220 formed from sheet metal and defining the bottom of each of three cells 222, 224 and 226. The common duct partial section 220 includes a straight edge portion 228 along its left edge, and a folded over groove portion 230 along its right edge. At intermediate locations across the common duct partial section 220 are two relatively shallow depressions 232 and 234 which run lengthwise along the length of the duct partial section 220.

The duct 218 also includes first, second and third individual duct partial sections 232, 234 and 236 substantially identically formed from sheet metal. The first individual duct partial section 232 has a grooved edge portion 238 which has the straight edge portion 228 of common duct partial section 220 received therein. Edge portions 228 and 238 are preferably crimped together as shown in FIG. 12. The first individual duct partial section 232 also includes a horizontally outwardly extending flanged edge portion 240 which is superimposed upon a planar portion of common duct partial section 220 and attached thereto by any of a number of means such as tabs and notches, rivets, welding, or the like.

The second individual duct partial section 234 also has a grooved portion 242 defined by a bending of the sheet metal. This is not, however, associated with a tongue or straight edge of the common duct partial section 220, but instead simply rests in the shallow depression 232. The second individual duct partial section 234 is attached to the common duct partial section 220 by spot welding, rivets, or the like.

The third individual duct partial section 236 has a grooved edge portion 244 which again rests in a shallow depression 234. It also includes a flanged tongue edge portion 246 received in the groove 230 of common duct partial section 220. The tongue and groove 246, 230 can be further held together by crimping or the like as shown in FIG. 12. The groove portion 244 can be attached to the shallow depression 234 by spot welding, rivets or the like.

FIG. 17 shows another triple cell embodiment of the invention designated as 248. The duct 248 includes a common duct partial section 250 formed from sheet metal. It also includes first, second and third individual duct partial sections 252, 254 and 256 substantially identically formed from sheet metal.

The first individual duct partial section 252 is channel shaped in cross section having a central web 258 with a shorter leg 260 and a longer leg 262 extending from the web 258.

Similarly, second individual duct partial section 258 has a web 264, shorter leg 266, and longer leg 268. The third individual duct partial section 256 includes web 270, shorter leg 272 and longer leg 274.

The first, second and third individual duct partial sections 252, 254 and 256 are arranged side by side with adjacent legs of adjacent individual duct partial sections being of like length. That is, the adjacent individual duct partial sections 252 and 254 have their short legs 260 and 266, respectively, adjacent each other. The adjacent individual duct partial sections 254 and 256 have their longer legs 268 and 274, respectively, located adjacent each other.

The common duct partial section 250 in combination with the individual duct partial sections 252, 254 and 256 defines three cells 276, 278 and 280.

The common duct partial section 250 includes a plurality of shorter legs 282, 284 and 286 and a plurality of longer legs 288, 290 and 292. The shorter and longer legs of the common duct partial section 250 are complementary with and overlap longer and shorter legs, respectively, of the individual duct partial sections. That is, for example, the shorter leg 282 of common duct partial section 250 is complementary with and overlaps the longer leg 262 of first individual duct partial section 252. Similar relationships are seen between the other legs of the common duct partial section 250 and the various individual duct partial sections.

Each of the individual duct partial sections 252, 254 and 256 can be generally described as defining at least a substantial part of at least three sides of the generally rectangular cross-sectional shape of its respective cell.

The overlapping legs of the common duct partial section 250 and the individual duct partial sections are held together by interlocking means such as that generally designated by numeral 294 for overlapping legs 262 and 282, which interlocking means is integrally formed from the sheet metal of the individual duct partial section 252 and the common duct partial section 250 for holding the same together. The interlocking means 294 can be any one of several forms previously described. Preferably, it is one of the stitched type interlocking means such as shown in FIGS. 10 or 11.

It is noted that the individual duct partial sections 252, 254 and 256 of FIG. 17 are substantially identical to the duct half sections 12C and 14C of FIG. 3. Thus, it is again possible to manufacture a line of single, double and triple cell ducts utilizing only a single form for the individual duct partial sections. It will be apparent that a double cell duct could be constructed in a manner analogous to the triple cell duct 248.

All of the duct designs disclosed herein are preferably formed from galvanized sheet metal for better corrosion protection against scratching and handling damage.

One very significant advantage of the various duct constructions disclosed herein is that the final assembly of the duct is not dependent upon the use of large fixed location equipment, but rather the various integrally formed interlocking structures can be constructed with hand-held tools on the job site. Thus the duct partial sections can be shipped in an unassembled form and assembled together on the job site if desired.

Also, most of the embodiments disclosed above are completely free from the use of any auxiliary fasteners such as screws, welds and the like. This also minimizes costs in the final assembly of the ducts.

Thus it is seen that the apparatus of the present invention readily achieves the ends and advantages mentioned as well as those inherent therein. While certain preferred embodiments of the invention have been illustrated and described for purposes of the present disclosure, numerous changes in the arrangement and construction of parts may be made by those skilled in the art, which changes are encompassed within the scope and spirit of the present invention as defined by the appended claims.

What is claimed is:

1. A floor duct, comprising:
   first and second duct partial sections formed from sheet metal, each said partial section having first and second lengthwise edge portions, said first and second duct partial sections being held together by a tongue and groove interlocking structure integrally formed from the sheet metal of the lengthwise edge portions of said duct partial sections, said tongue and groove interlocking structure including a first tongue defined by the first lengthwise edge portion of the first duct partial section and a first groove defined by the second lengthwise edge portion of the second duct partial section, said first grove being formed by an S-shaped double fold of said sheet metal, said first tongue being held in place in said first groove primarily by frictional engagement therebetween, said first and second section duct partial sections being substantially identical and defining a generally rectangular cross-section having four sides and said tongue and groove interlocking structure defining a portion of one of said sides and being generally parallel to said one side.

2. The floor duct of claim 1, wherein:

said tongue and groove structure further includes a second tongue received in a second groove defining a portion of another of said sides opposite said one side, said second tongue being defined by the first lengthwise edge portion of said second duct partial section and said second groove, being defined by said second lengthwise portion of said first duct partial section.

3. The floor duct of claim 2, wherein:

said first tongue and groove and said second tongue and groove are located adjacent diagonally opposite corners of said generally rectangular cross section.

4. The floor duct of claim 1, wherein:

said S-shaped double fold forms a rolled hem lying outside of said tongue.

5. The floor duct of claim 1, wherein:

said S-shaped double fold forms a rolled hem lying inside said tongue.

6. A two-cell floor duct, comprising:

a common duct partial section formed from sheet metal defining at least one wall of each of two parallel cells, said common duct partial section being a generally planar sheet having a raised central rib integrally formed by two S-shaped folds of said sheet metal to define two oppositely facing rib grooves, said planar sheet having two straight edge portions extending generally parallel to said rib; and two individual duct partial sections substantially identically formed from sheet metal, each of said individual duct partial sections in combination with an associated portion of said common duct partial section defining one of said two parallel cells, each of said individual duct partial sections including a tongue defined along one lengthwise edge portion thereof and a groove defined along the other lengthwise edge portion thereof by folding over the sheet metal along said other lengthwise edge portion, said tongue being received in one of the rib grooves of said common duct partial section and said groove of said individual duct partial section having one of said straight edge portions of said common duct partial section received therein.

7. A multi-cell floor duct, comprising:

at least two individual duct partial sections substantially identically formed from sheet metal, each of said individual duct partial sections being channel-shaped in cross section having a central web with a shorter leg and a longer leg extending from said web, said individual duct partial sections being arranged side by side with adjacent legs of adjacent individual duct partial sections being of like length; and a common duct partial section formed from sheet metal and in combination with said individual duct partial sections defining at least two cells, said common duct partial section having a plurality of complementary shorter and longer legs engaging with and overlapping longer and shorter legs, respectively, of said individual duct partial sections.

8. The duct of claim 7, further comprising:

an interlocking means integrally formed from the sheet metal of said individual duct partial sections and said common duct partial section for holding said individual duct partial sections in place on said common duct partial section.

9. A floor construction, comprising:

a generally horizontal extending multi-cell floor duct, including:

a common duct partial section formed from sheet metal and defining at least one side of each of a plurality of parallel cells, each of said parallel cells having a generally rectangular cross-sectional shape; and a plurality of individual duct partial sections substantially identically formed from sheet metal and each of said duct partial sections defining at least a substantial proton of at least three sides of said rectangular cross-sectional shape of a respective one of said cells, each of said individual duct partial sections in combination with an associated portion of said common duct partial section defining a respective cell of said plurality of parallel cells; and a concrete floor poured in place about said duct so that said duct is substantially completely surrounded by concrete on all sides of a cross section of said duct.

10. The floor construction of claim 9, wherein: said at least one side of each of said cells defined by said common duct partial section is a bottom side of each of said cells.

* * * * *